(12) United States Patent
Kovác

(10) Patent No.: US 11,550,910 B2
(45) Date of Patent: Jan. 10, 2023

(54) CREATING GENERIC RULES IN A HIGH DIMENSIONAL SPARSE FEATURE SPACE USING NEGATIVE FEEDBACK

(71) Applicant: Avast Software s.r.o., Prague (CZ)

(72) Inventor: Peter Kovác, Prague (CZ)

(73) Assignee: Avast Software s.r.o., Prague (CZ)

( * ) Notice: Subject to any disclaimer, the term of this patent is extended or adjusted under 35 U.S.C. 154(b) by 589 days.

(21) Appl. No.: 16/588,704

(22) Filed: Sep. 30, 2019

(65) Prior Publication Data
US 2021/0097179 A1   Apr. 1, 2021

(51) Int. Cl.
*G06F 21/56* (2013.01)
*G06F 16/28* (2019.01)

(52) U.S. Cl.
CPC .......... *G06F 21/562* (2013.01); *G06F 16/285* (2019.01)

(58) Field of Classification Search
CPC .... G06F 21/562; G06F 21/564; G06F 16/152; G06F 16/90344
See application file for complete search history.

(56) References Cited

U.S. PATENT DOCUMENTS

| 8,640,245 | B2 | 1/2014 | Zaitsev et al. |
| 10,826,931 | B1 * | 11/2020 | Quan .................. H04L 63/1441 |
| 11,003,773 | B1 * | 5/2021 | Fang ........................ G06N 3/08 |
| 2008/0127336 | A1 | 5/2008 | Sun et al. |
| 2017/0083703 | A1 | 3/2017 | Abbasi et al. |
| 2017/0262633 | A1 * | 9/2017 | Miserendino .......... G06N 5/025 |

FOREIGN PATENT DOCUMENTS

EP    2472425 B1    9/2015

* cited by examiner

*Primary Examiner* — Philip J Chea
*Assistant Examiner* — Austin W Collier
(74) *Attorney, Agent, or Firm* — Avek IP, LLC; William B. Kircher

(57) ABSTRACT

Systems and methods use negative feedback to create generic rules for a high dimensional sparse feature space. A system receives a set of fingerprints, where a fingerprint can be a set of features of a file. The fingerprints can be clustered according to similarity. For each cluster, a proto-rule is created that has a condition for each feature. The proto-rule is simplified using negative feedback to create a well-formed rule having a comparatively small subset of the conditions in the proto-rule that are useful in determining malware. The well-formed rule can be added to a set of rules used in a malware detection system.

19 Claims, 5 Drawing Sheets

US 11,550,910 B2

CREATING GENERIC RULES IN A HIGH DIMENSIONAL SPARSE FEATURE SPACE USING NEGATIVE FEEDBACK

FIELD

The disclosure relates generally to logical rule creation, and more particularly, to creating rules in a high dimensional feature space using negative feedback.

BACKGROUND

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware etc. A common mechanism used by malware developers is to embed the malware into a file that is made to appear desirable to user or is downloaded and executed when the user visits a web site. For example, malware may be embedded into a software application that appears legitimate and useful. The user downloads the file, and when the file is opened, the malware within the file is executed. A file that contains malware can be referred to as a malicious file.

In the face of the growing threat of malware, many anti-malware software packages were developed to detect malware in a user's files. Upon detection, the anti-malware software may notify the user of the presence of the malware and may automatically remove or quarantine the malware. Detecting malware can be a difficult task, because millions of new files are created every day. Further, new malware threats are constantly being developed. Adapting to these new malware threats in a timely manner can be difficult.

BRIEF DESCRIPTION OF THE DRAWINGS

For a better understanding of the inventive subject matter, reference may be made to the accompanying drawings in which.

DETAILED DESCRIPTION

Figure 1:
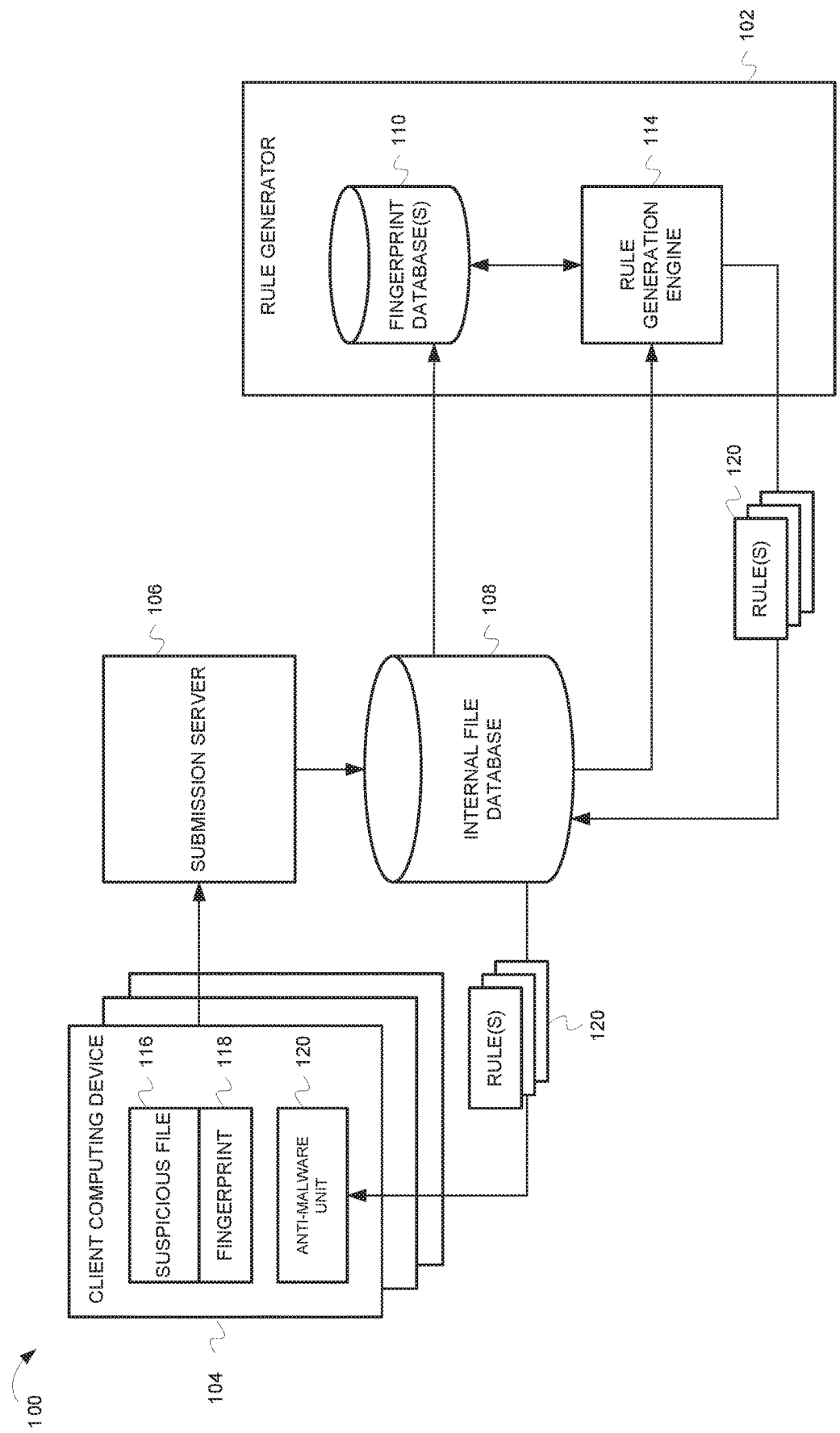
FIG. 1 is a block diagram of illustrating components of a system for automatically generating rules that describe malicious files.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram of illustrating components of a system 100 for automatically generating rules that describe malicious files. In some embodiments, system 100 includes rule generator 102, client computing device 104, submission server 106, and internal file database 108.

Client computing device 104 can be a desktop computer, laptop computer, tablet computer, smart phone, personal digital assistant, media player, set top box, or any other device having one or more processors and memory for executing computer programs. The embodiments are not limited to any particular type of computing device. Client computing device 104 can include an anti-malware unit 120. Anti-malware unit 120 can include one or more of software, firmware or other programmable logic that can detect malicious files. Additionally, anti-malware unit 120 can submit a suspicious file 116 for analysis. The file may be determined to be suspicious based on information from other anti-malware systems, of from relevant data about the file. For example, the source of the file (either URL or disk path) may indicate that the file is from a suspicious source. Further, the file may be suspicious if the file has only been seen on a low number of systems (e.g., the file may be a day one malware source). In some embodiments, anti-malware unit 120 can generate a fingerprint 118 (also referred to as a "file fingerprint") that is a data structure used to represent features or aspects of a file 116. The fingerprint data structure can be a vector of features of a file that can be used to assist in determining if a file contains malware. In general, a feature can be any descriptive element or property of a file or file metadata such as file size, file type etc. In some embodiments, a fingerprint may represent over 100 features of a file. However, the inventive subject matter is not limited to any particular number of features for a fingerprint 118, and a fingerprint may have more than 100 features or less than 100 features. Further details on fingerprint 118 are provided below with respect to FIG. 2.

Client computing device 104 can submit suspicious file 116 and fingerprint 118 to submission server 106. Submission server 106 can perform preprocessing on the suspicious file 116 and place the results of the preprocessing in an internal file database 108. In some aspects, the preprocessing can include "uniquization", i.e., determining that the file is not processed more than once, receiving file metadata from other systems (e.g., receiving data regarding how often the file has been seen on customer systems), or running other anti-malware software on the file. In some aspects, the source of the file (i.e., a URL and/or disk path) may be stored in the internal file database.

Rule generator 102 can receive data from internal file database 108 and use the data to automatically generate rules that describe malicious files. In some embodiments, rule generator 102 can include a fingerprint database 110 and a rule generation engine 114. Fingerprint database 110 comprises one or more databases that contain fingerprint data. In some embodiments, the fingerprint database includes three databases of fingerprints: a malwareset, a cleanset, and unknownset. Malwareset fingerprints are associated with malicious files that are known to contain malware. Cleanset fingerprints are associated with files that are known to be free from malware. Unknownset fingerprints are fingerprints that have been submitted for classification, but no classification has yet been made or no classification could be determined. In some aspects, fingerprints in the cleanset database are maintained indefinitely, i.e., the cleanset database contains all of the clean classified fingerprints that have ever been seen. The malwareset and unknownset database can contain fingerprints for a sixty day window. That is, only fingerprints seen in the most recent sixty days are maintained in the malwareset and unknownset. In some embodiments, a separate database can be maintained for each classification (cleanset, malwareset, unknownset) of fingerprint. In alternative embodiments, a single database can be maintained that holds all three classifications.

Rule generation engine 114 receives fingerprints from fingerprint database 110 and generates one or more rules that can be applied to a fingerprint to determine if the fingerprint is associated with a malicious file. A rule can include one or more conditions regarding the features contained in a fingerprint. In some aspects, a condition in a rule can have the form:

<feature> <operator> <argument(s)> where feature is one of the features contained in the fingerprint, operator can be an operation that is applied to the feature and the argument(s) in the condition, and argument(s) can be numerical or string literals. In some aspects, the operators can include one of {==, !=, RANGE, !RANGE }. Those of skill in the art having the benefit of the disclosure will appreciate that many other operators are possible and within the scope of the inventive subject matter. The set of operators that are used in rules can have an impact on the execution speed of the system. Use of a relatively small set of operators can reduce the number of possible candidate rules thereby limiting the search space for rules and reducing the amount of time and resources it takes to determine a good rule. Thus, the number of operators can depend on the response requirements of the system. In embodiments that can achieve real time or near real time response, the number of operators can be more limited than in embodiments that do not attempt to achieve real time response. The number of arguments in a rule depends on the operator used. A feature may be used multiple times in one rule. In some aspects, in order for a rule to match a fingerprint, all of its conditions must evaluate to true.

As an example, a rule may be defined as follows:
file length RANGE 0x100 0x1000
file crc32==0x7C36A412

In this example, in order for the rule to evaluate to "true," two conditions must be met:

1) the file must have a length between 100 KB and 1000 KB, and
2) the thirty-two bit cyclic redundancy check (CRC32) value for the file must be 0x7C36A412

One type of rule is referred to as a "proto-rule." A proto-rule is a rule that has exactly one condition for every feature present in the fingerprint or a set of fingerprints (with a few exceptions). Such rules can be used to very specifically describe one or more fingerprints (usually a family of malware) but may be impractical to use in file analysis for several reasons:

1. Too large—A file in some embodiments has over 100 features. This results in a proto-rule having over 100 conditions and is thus very large. This can be a drawback because it can be expected to have hundreds of thousands or even millions of rules, which would make rule updates expensive (large downloads for users . . . )
2. Too slow—evaluating hundreds of conditions is much slower than evaluating just a few, slowing down the scanning process
3. Too specific—with so many conditions it is unlikely that any yet to be discovered variants of the described malware family would satisfy them all, thus evading detection. A more generic rule can be much more desirable.

However even with drawbacks noted above, a creating a proto-rule may be a desirable step in creating a useful generic rule as described below.

Another type of rule is referred to as a "well-formed rule." A rule is well-formed if at the time of its creation it did not match any fingerprints in the cleanset database and at the same time matched at least one fingerprint from each of the malwareset and unknownset database.

Further details on the operation of the above-describe system are provided below with reference to FIGS. 3 and 4.

Figure 2:
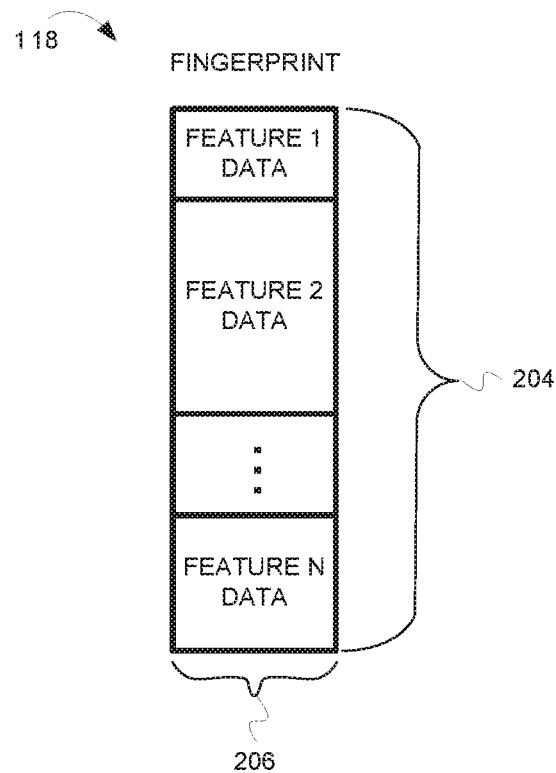
FIG. 2 illustrates an example file fingerprint.

FIG. 2 illustrates an example fingerprint 118. A fingerprint 118 can include a vector of features 204. The vector of features 204 can be obtained by analyzing the file (e.g., by anti-malware unit 120) do determine the features of the file. In some aspects, each feature can be described by feature data 206 Feature data 206 can be actual feature data extracted from the file, or it can be data that is processed and converted from one or more data elements in the file. Each feature 206 may have an associated type. Examples of such types include signed integer, unsigned integer, string, etc. Further, each feature may be associated with a semantic. A semantic can provide a higher level meaning or description of a feature. For example, a semantic can describe the feature data 206 as a simple value, an offset, a checksum etc. In some aspects, the feature vector 118 is a sequence of bytes. A "layout definition" determines how the feature vector 118 is interpreted. For example, the layout may determine that the first four bytes represent the "file length" (this is the name of the feature), that the data type of these four bytes is "integer" and the semantic is "simple value" and that the next twenty bytes represent the file checksum which is character string and the semantic is a file name that is opened by the executable. Thus, the data type and/or semantic for a feature can be determined according to the layout definition associated with the feature vector 118. In alternative aspects, the data type and/or semantic for a feature 206 in a feature vector 118 can be included as part of the feature vector.

Figure 3:
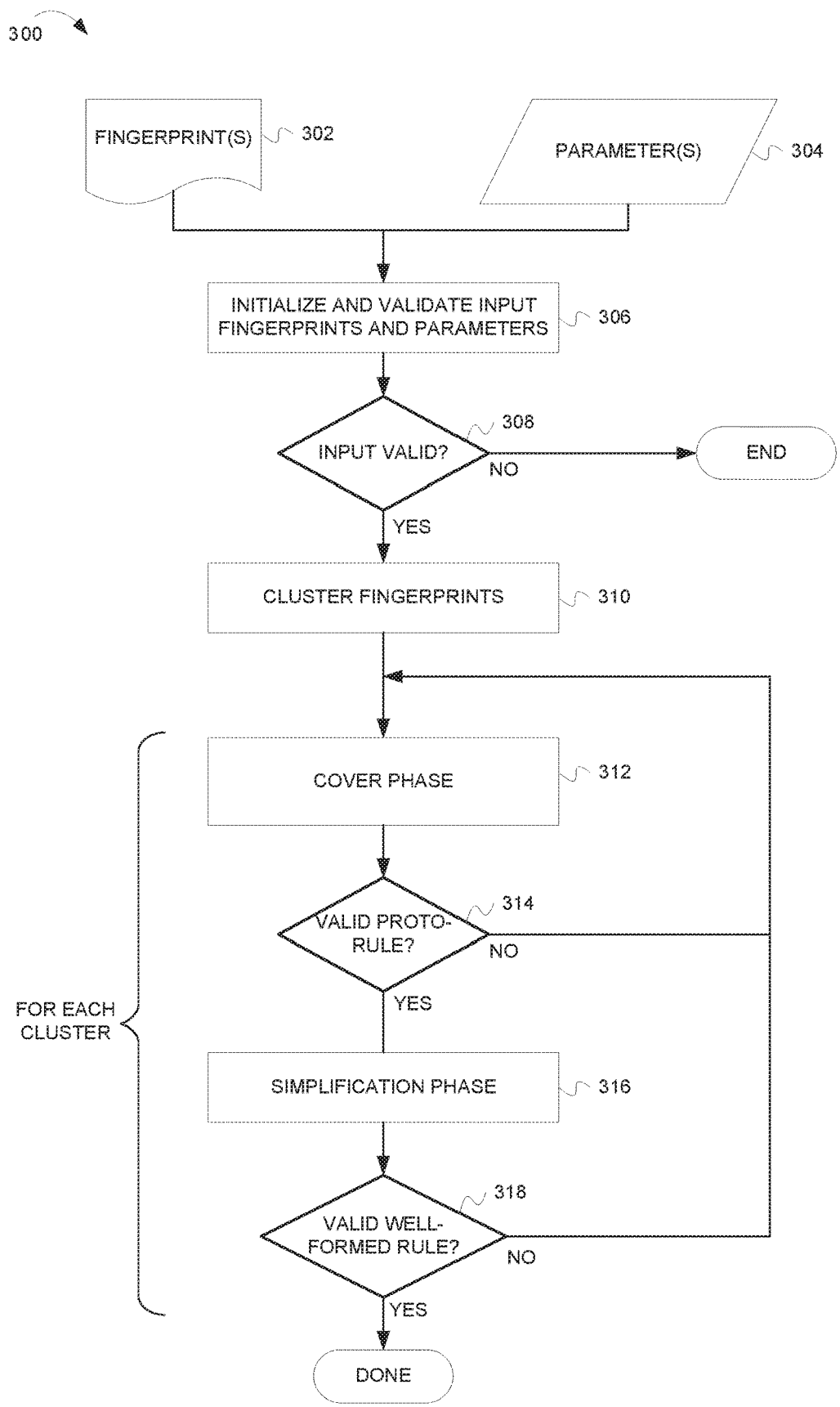
FIG. 3 is a flow chart illustrating operations of a method for automatically creating generic rules in a sparse feature space using negative feedback.

FIG. 3 is a flow chart 300 illustrating example operations of a method for automatically creating generic rules in a sparse feature space using negative feedback. Some or all of the operations illustrated in FIG. 3 may be executed for example by a rule generation engine 114.

At block 306, rule generation engine 114 receives a set F of one or more fingerprints 302 and one or more initialization parameters 304 as input data. In general, the set F will include at least one new fingerprint. Typically, most of the fingerprints in set F will be fingerprints that have not been seen or processed before. However, some fingerprints may have been seen before and may already exist in the unknown set or malware set of fingerprints. The size of set F can be from one to thousands of fingerprints. The rule generation engine 114 can validate the one or more fingerprints 302 in set F and the one or more initialization parameters 304. As noted above, in some embodiments, a fingerprint is a fixed feature vector. Thus, one example of a validation is a check if the fingerprint has the expected length and number of features. Parameter validation can include one or more "sanity checks". For example, one of the parameters can be the minimum length (number of conditions) the generated rule should have. If this value is larger than the number of features in the fingerprint, then it is obviously impossible (and also impractical, the rule would be huge) to generate such a rule. If any of the fingerprints 302 or parameters 304 are invalid, then at decision block 308, rule generation engine 114 can reject the input and the method ends. If the set F of fingerprints 302 and parameters 304 are valid, then at decision block 308 the method proceeds to block 310.

At block 310, the set F of fingerprints 302 are clustered into C clusters. For example, individual clusters of fingerprints may be formed using a nearest neighbor algorithm. It can be desirable to split the input set of F fingerprints 302 into clusters of similar fingerprints as doing so may allow for more accurate rules to be generated for each cluster separately. It may also be the case that no clusters are found in this phase, in which case the method stops. Otherwise the operations of blocks 312-318 may be performed for each cluster c in C.

At block 312, cover phase operations are performed. In this phase, the fingerprint databases (e.g., fingerprints in the malicious set of fingerprints and fingerprints in the unknown set of fingerprints) are searched for similar malicious and unknown fingerprints to those in the cluster, thus enriching the cluster with more relevant information. Further, fingerprints too similar to fingerprints in the clean database can be pruned from the cluster. This can be desirable as pruning can refine the cluster so that a good proto-rule based on the cluster can be generated, with minimal chance of false positives. After the cluster has been adjusted in the cover phase operations, a proto-rule can be created based on the features of the fingerprints in the cluster. In some embodiments, a proto-rule may be created using a set of fingerprints. For every feature, a rule generator can go through all the values of the feature in the set and finds the minimum and maximum values. If they are identical (meaning all fingerprints share the same value in the whole set) then the resulting condition is of the form "feature==value." Otherwise, the rule generator can use the form "feature RANGE min max." For some features a RANGE may not make sense (for example checksums) and in that case the condition may not be used in defining a proto-rule.

At decision block 314, a check is made to determine if a valid proto-rule has been created. In some aspects, a valid proto-rule is a proto-rule that does not match on any rule in the clean set of fingerprints. However, in the unlikely case of the proto-rule having false positives the method stops with respect to the current cluster. This is because in that case it is not possible to create a well-formed rule. The method can then proceed to block 312 to process the next available cluster (if any). If the check at block 314 determines that a valid proto-rule has been created, the method proceeds to block 316.

At block 316, simplification operations are performed. In the simplification phase of the method, a proto-rule is received and analyzed. In general, the simplification phase attempts to simplify (e.g., shorten) the proto-rule into a well-formed rule. A goal of simplification phase is to select a subset of all the rule conditions in such a way that the resulting rule is as acceptably small (perhaps as small as possible), and is well-formed. There can be other considerations that go into the selection process. For example, it is desirable that a rule should be as generic as possible, but at the same time precise enough to identify just the given malware family and nothing else, or at least nothing benign. This can be very difficult to achieve, since even with the availability of massive databases, the examples in the databases are typically just a very small fraction of all the existing files. This can limit the ability to avoid some never before seen benign files and not yet discovered new threats. The inventors have discovered that the method described herein can show very good behavior with respect to these goals. At the end of the simplification phase, a comparatively short well-formed rule can be formed.

At block 318, a check is made to determine if a valid well-formed rule has been formed. A valid well-formed rule can be a rule for which there are no false positives in the set of clean fingerprints. In some cases, it may not be possible to form a short well-formed rule. In some embodiments, some of parameters 304 may determine whether a valid well-formed rule can be, or has been, created. Examples of such parameters include the minimum and maximum number of conditions a well-formed rule may have, the minimum number of malicious files (or objects) that must be identified in order to be considered useful, or the maximum number of iterations to perform in a certain phase of the algorithm. The specific parameter values may depend on the specific domain the systems and methods are applied to. For example, there may be different values for Windows binaries than for Android APKs.

If the check at block 318 determines that a well-formed rule has not been formed, the proto-rule initially provided as input to the method can be submitted to other analysis systems for further examination. If a valid well-formed rule has been formed, it can be added to a set of rules 120 used for malware detection. The set of rules may be distributed to client computing devices 104 for use by anti-malware units on the client computing devices 104.

Figure 4:
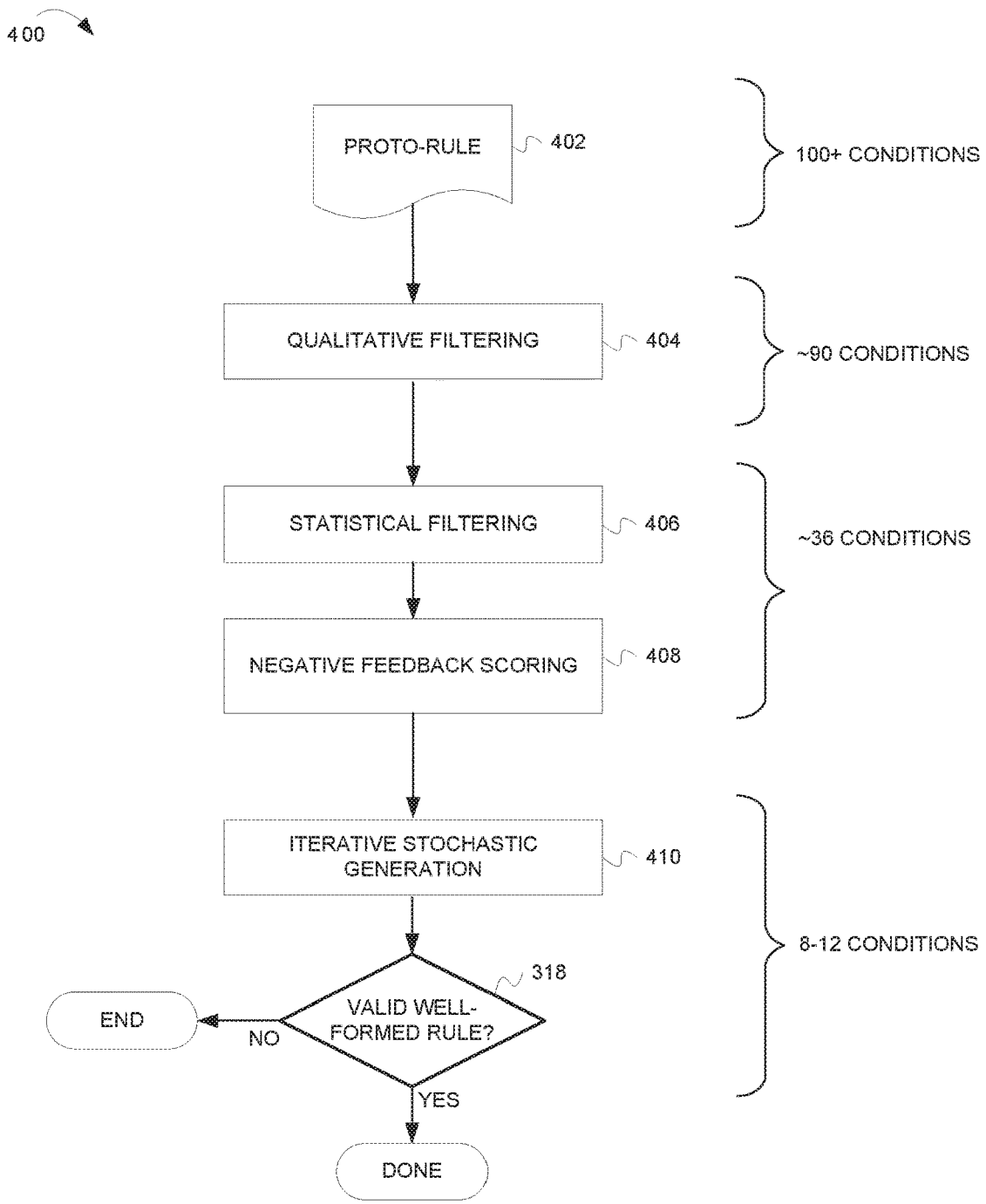
FIG. 4 is a flow chart providing further details on operations of a simplification phase of the method illustrated in FIG. 3.

FIG. 4 is a flow chart 400 providing further details on example operations a simplification phase of block 316 in the method illustrated in FIG. 3. As noted above, the simplification phase receives a proto-rule 402. The number of conditions in a proto-rule 402 can be the number of features extracted from a file or object. In some embodiments, this can be over 100 features, and thus the proto-rule 402 may have over 100 conditions. A desirable goal is to select a small subset (about 8 to 12) of the conditions in the initial proto-rule to use in a well-formed rule that can be the output of the simplification process. The number of possible combinations of conditions is massive (hundreds of billions) and typical systems may only be able to test at most a couple of thousand conditions (because of time constraints). As a result, a purely stochastic approach may not be viable. The first two steps of the simplification phase are aimed at reducing the number of conditions by removing those of low quality (e.g., those conditions that would likely cause false positives by being too generic). The next step is proactively seeking conditions that lead to false positives and avoiding inclusion of such conditions in rules. This can further improve the likelihood of selecting a good subset of conditions for a well-formed rule.

At block 404, qualitative filtering is performed. In qualitative filtering, every condition of the proto-rule can be examined separately. A score is calculated for each condition using the formula:

$$C_{score} = C_{density} * C_{balance}$$

where:

$$C_{density} = |V|/(V_{max} - V_{min} + 1)$$

Thus, $C_{density}$, the density of the condition, can be the number of distinct values V in the cluster divided by the size of the interval of the condition.

$$C_{balance} = V_{frec\_avg}/V_{freq\_max}$$

Thus, $C_{balance}$, the balance of the condition, can be the average frequency of values divided by the frequency of the most frequent value It follows that the resulting score $C_{score}$ is a value between 0 and 1. The most desirable conditions are those that have a $C_{score}$ value as close to 1 as possible, since in that case the range is dense and balanced, thus providing a very good description of the cluster. On the other hand, a sparse range with one dominating value hints at anomalies or outliers which is not a desirable property of the condition. Thus, in some embodiments, the method can remove (filter out) all conditions with a value below 0.2 (though different settings are possible of course and might be beneficial if the time constraints are not so strict, allowing more conditions to be considered in later phases). In some cases, an average about 10% of the conditions are removed during this phase.

At block 406, statistical filtering is performed. The conditions in the proto-rule that remain after qualitative filtering are analyzed on the three fingerprint databases. Three numbers can be obtained for every condition: C, M, U—representing the fraction of fingerprints matching the given condition on clean (C), malware (M) and unknown (U) databases respectively. A new score can be calculated for every remaining condition:

$$C_{score} = ((5*(1-C)) + MU_{avg}) * (1 - MU_{avg})$$

where:

$$MU_{avg} = ((2*M) + U)/3$$

The higher the score of a condition the better. The B best scoring conditions are kept, and the rest can be removed. B typically has a value around 36 (usually calculated as 3*the maximum number of allowed conditions in a well formed rule (usually 12)). The $MU_{avg}$ can be used to give slightly more weight to the malware database.

At block 408, negative feedback scoring is performed. After the statistical filtering has been performed, the set of conditions has typically been narrowed down to a smaller subset B of the most desirable conditions (from a probabilistic point of view), and the number of viable combinations has typically been reduced to a much smaller number. However, there can still be hundreds of millions of possibilities—orders of magnitude more than can typically be reasonably tested.

In negative feedback scoring, the following loop of operations is executed:
1. Pick a random subset S from the B conditions and initialize the scores of conditions in S to zero (0).
2. Find fingerprints on the clean database matching S.
    a. If there are none, improve the score of the conditions in S and stop. In some aspects, the score can be increased by one (1). However, other increase values are possible and within the scope of the disclosure.
    b. If fingerprints are found in the clean database that match S, then the score can be decreased by 1.5. However, other decrease values are possible and within the scope of the disclosure.
3. Form a cluster from the clean fingerprints and create a proto-rule P.
4. Compare conditions in S with those in P:
    a. Score of same or similar conditions are penalized (reduced) in B. In some aspects, the score can be reduced by 0.1. However, other reduction values are possible and within the scope of the disclosure.
    b. Score of different conditions are increased in B. In some aspects, the score is increased by 0.5. However, other increase values are possible and within the scope of the disclosure.
    c. Score of conditions not in S are left intact in B.

As noted above, the values used to increase or decrease condition scores may vary from the examples provided. In general, it is desirable that the values are of similar magnitude so that one does not completely cancel out the influence of others.

In this way, the system stochastically finds fingerprints that could potentially be false positives and lower the chance of conditions that they have in common with the candidate cluster. The number of times the above loop is run can depend on how much time is desired to be spent here but generally at least several dozen iterations are required for the scores to converge.

Operations 4(a) in the loop above compared conditions to determine if they are the "same or similar." In some embodiments, conditions can be considered similar under three cases:

1. The conditions are exactly the same
2. The condition in P is a subset of the condition in S (for example "x<5" is a subset of "x<9")
3. The condition in P overlaps with a condition in S or a condition in S overlaps with the condition in P.
   (for example, x>5 && x<10 overlaps with x>7 && x<12)

Thus, even just a partial resemblance of conditions can lead to penalization, thereby helping to ensure that even a partial similarity of objects is not allowed.

After negative feedback scoring, the top scoring terms typically have comparatively low chances of producing false positives.

At block 410, iterative stochastic generation operations are performed. At this point in the method, the scores of the subset B of the proto-rule have been updated. A well-formed rule can now be created. The process to create a well-formed rule in some embodiments is as follows:

1. Set N to the smallest number of allowed conditions in a well-formed rule
2. Repeat R times (for example R=8):
   a. Pick random N terms from the N+X best scoring conditions from B (where X is a small constant for example 4) and create a candidate rule from them
   b. Calculate the C, M, U values of the candidate rule corresponding on the number of matches on clean (C), malware (M) and unknown (U) fingerprint databases
   c. If C is zero keep the candidate rule otherwise discard it
3. If there is at least one candidate rule pick the one with the highest M+U, otherwise increment N and go back to 2 unless N is equal to the maximum number of conditions in a well formed rule in which case the algorithm ends with a failure (no well-formed rule possible)

The determination of values for R (the repeat count) and X can be determined in various ways. For example, a choice for the value for R may depend on how much time the user is willing to spend on creating a rule. The more time (i.e., the more iterations) the higher the chance of generating a good well-formed rule. Thus, R can range from a very low i.e., two iterations, eight iterations, as stated above, or several hundreds of iterations. In some embodiments, the value for R is 64.

X can be empirically chosen. As noted above, a well-formed rule has a minimum length. Thus, a goal of the system is to create a rule of length N (where the value of N starts at the minimum allowed length for the final well-formed rule). If limited to just N best conditions, there would be just one possible well-formed rule formed by taking the best N conditions and with nothing more required. By increasing the number of conditions by that are considered by X, the number of possibilities that can be tried is increased. In some aspects, X is chosen to be small so that the number of possibilities is not large thus limiting the generator to the "best of the best" conditions.

As an example, consider choosing subsets from N+12 conditions. This would tremendously increase the number of possibilities while at the same time decreasing the overall quality of the chosen conditions (since the chance of selecting the best from the N+12 is the same as selecting the worst).

Thus, using N=8 and X=4, the system is picking 8 conditions from 12. There are 495 possibilities. Assuming R=64 (see above), the system can try 64 of those 495 possibilities.

As a further example, if X=12, then the system would be choosing 8 from 20 conditions, which is over 125 000 possibilities. Given that it may only be practical to test at most a couple hundred of conditions due to resource limitations (time, processor capability etc.), the system would check much less than 1% of those, compared to 64/495=13%. It is more desirable to do several iterations where the system checks 13% of the best possibilities than one where barely 1% are checked and the quality of the possibilities is much worse.

The algorithm favors shorter well-formed rules over longer ones. It also prefers more generic rules (higher number of matches on malware and unknown fingerprint databases) over those more specific. Further, as a result of the three filtering (scoring) phases before, the probability of false positives can be near zero and the algorithm finishes with success in most cases.

In some embodiments, either or both the qualitative filtering at block 404 and the statistical filter at block 406 can be omitted. Thus, these first two filtering phases can be viewed as optimizations used to reduce the number of iterations needed.

After the operations of blocks 404-410 have been performed, the check at block 318 (FIG. 3) described above can be performed to determine if a valid well-formed rule has been created.

The above-described techniques, systems, and methods have been discussed in the context of malware detection. One of skill in the art having the benefit of the disclosure will appreciate that the techniques disclosed herein can be applied in other contexts and domains as well.

The creation and update of efficient rules for detecting malware is one example of a practical application of the above-described systems and methods. The techniques described herein can provide technical advantages of conventional systems. For example, the techniques described herein can automatically generate well-formed rules that avoid false positives when applied in malware detection systems. This is a technical solution to a problem with conventional systems in which rules may be manually generated, and in conventional system that generate rules that have a higher probability of generating false positives. Additionally, the techniques described herein can provide for rapidly generating rules, which allows quicker reaction to threats while at the same time requiring less resources (computing power) to do so.

Figure 5:
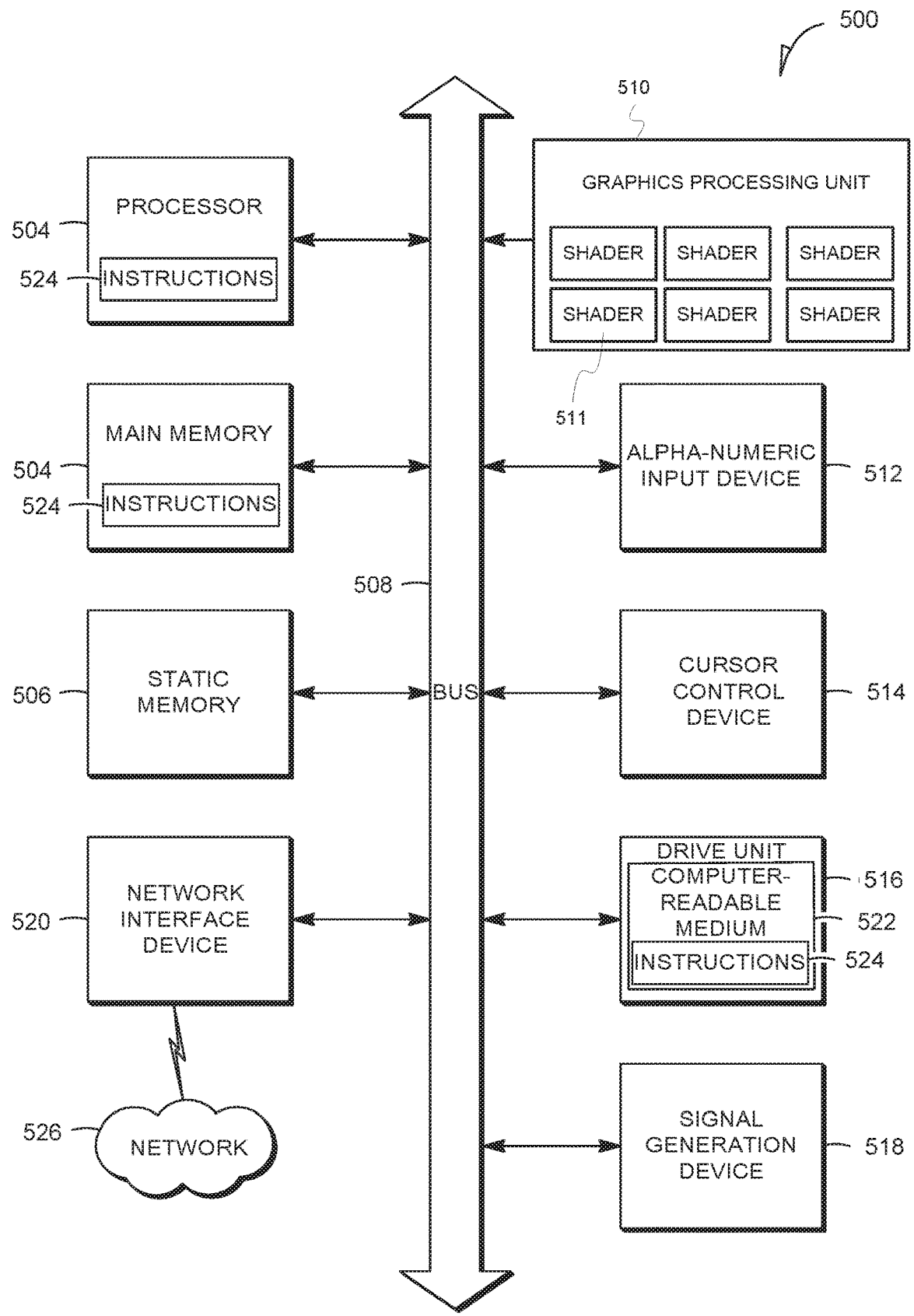
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502, a main memory 504 and a static memory 506, which communicate with each other via a bus 508. The computer system 500 may further include graphics processing unit 510 that may be coupled to a video display unit (e.g., a liquid crystal display (LCD) or a cathode ray tube (CRT)). A graphics processing unit 510 may include multiple shaders 511 that can be programmed to execute some or all of the above-described rule generation functionality. In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:
1. A method comprising:
receiving, by one or more processors, a set of fingerprints, each fingerprint including a set of features of a file;
clustering, by the one or more processors, the set of fingerprints into one or more clusters; and
for each cluster of the one or more clusters:
creating a proto-rule,
simplifying the proto-rule using negative feedback to create a candidate well-formed rule, comprising:
randomly selecting a subset of conditions in the proto-rule;
in response to determining that none of the conditions in the subset match any of the fingerprints in a database of clean fingerprints improving the score of each of the conditions in the subset;
creating a second proto-rule from a cluster of clean fingerprints;

comparing each condition in the proto-rule with each condition in the second proto-rule; and in response to determining that a condition in the proto-rule is similar to a condition in the second proto-rule, reducing the score of the condition in the proto-rule, initializing N to the smallest number of conditions allowed in a well-formed rule;

iteratively performing for a predetermined or configurable number of iterations operations a-d comprising:
  a. randomly selecting a subset of N conditions from the N+X top scoring conditions, where X is a predetermined or configurable constant,
  b. creating a potential candidate rule from the subset of N conditions,
  c. determining a C score, M score, and U score for the potential candidate rule, the C score based, at least in part, on fractions of fingerprints matching the potential candidate rule in a database of clean fingerprints, the M score based, at least in part, on fractions of fingerprints matching the potential candidate rule in a database of malware fingerprints, and the U score based, at least in part, on fractions of fingerprints matching the potential candidate rule in a database of unknown fingerprints, and
  d. in response to determining that the C score is zero, adding the potential candidate rule to a set of potential candidate rules; and
selecting, as the candidate rule, a rule from the set of candidate rules having the highest combined M score and U score,
determining if the candidate well-formed rule is a valid well-formed rule, and
in response to determining that the candidate well-formed rule is a valid well-formed rule, adding the valid well-formed rule to a set of malware detection rules.

2. The method of claim 1, wherein creating the proto-rule comprises creating the proto-rule to have at least one condition for each feature in the set of features for a fingerprint.

3. The method of claim 1, wherein simplifying the proto-rule comprises:
determining a score for each condition in the proto-rule; and
removing from the proto-rule one or more conditions whose score is below a predetermined or configurable threshold.

4. The method of claim 1, wherein simplifying the proto-rule comprises:
determining a score for each condition in the proto-rule, the score based, at least in part, on respective fractions of fingerprints matching the condition in a database of clean fingerprints, a database of malware fingerprints, and a database of unknown fingerprints; and
retaining in the proto-rule one or more conditions whose score is in a set of top scores and removing from the proto-rule conditions whose score is not in the set of top scores.

5. The method of claim 1, further comprising:
in response to determining that the condition in the proto-rule is different from each condition in the second proto-rule, increasing the score of the condition in the proto-rule.

6. The method of claim 1, wherein determining that the condition in the proto-rule is similar to the condition in the second proto-rule comprises determining that the condition in the second proto-rule is a subset of the condition in the proto-rule.

7. The method of claim 1, wherein determining that the condition in the proto-rule is similar to the condition in the second proto-rule comprises determining that the condition in the second proto-rule overlaps the condition in the proto-rule.

8. The method of claim 1, wherein determining that the condition in the proto-rule is similar to the condition in the second proto-rule comprises determining that the condition in the second proto-rule is the same as the condition in the proto-rule.

9. The method of claim 1, further comprising:
in response to determining that the set of candidate rules is empty:
incrementing N;
iteratively performing operations a-d for the predetermined or configurable number of iterations.

10. A system comprising:
one or more processors;
a machine-readable medium having stored thereon instructions that, when executed, cause the one or more processors to:
receive a set of fingerprints, each fingerprint including a set of features of a file;
cluster the set of fingerprints into one or more clusters; and
for each cluster of the one or more clusters:
  create a proto-rule,
  simplify the proto-rule using negative feedback to create a candidate well-formed rule, comprising:
    randomly select a subset of conditions in the proto-rule;
    in response to a determination that none of the conditions in the subset match any of the fingerprints in a database of clean fingerprints improve the score of each of the conditions in the subset;
  create a second proto-rule from a cluster of clean fingerprints;
  compare each condition in the proto-rule with each condition in the second proto-rule; and
  in response to a determination that a condition in the proto-rule is similar to a condition in the second proto-rule, reducing the score of the condition in the proto-rule,
  initialize N to the smallest number of conditions allowed in a well-formed rule;
  iteratively perform for a predetermined or configurable number of iterations operations a-d comprising:
    a. randomly select a subset of N conditions from the N+X top scoring conditions, where X is a predetermined or configurable constant,
    b. create a candidate rule from the subset of N conditions,
    c. determine a C score, M score, and U score for the candidate rule, the C score based, at least in part, on fractions of fingerprints matching the candidate rule in a database of clean fingerprints, the M score based, at least in part, on fractions of fingerprints matching the candidate rule in a database of malware fingerprints, and the U score based, at least in part, on fractions of fingerprints matching the candidate rule in a database of unknown fingerprints, and d. in response to a determination that the C score is zero, add the potential candidate rule to a set of potential candidate rules; and selecting, as the candidate well-formed rule, a rule from the set of candidate rules having the highest combined M score and U score, determine if the candidate well-formed rule is a valid well-formed rule, and in response to a determination that the candidate well-formed rule is a valid well-formed rule, add the valid well-formed rule to a set of malware detection rules.

11. The system of claim 10, wherein the proto-rule comprises at least one condition for each feature in the set of features for a fingerprint.

12. The system of claim 10, wherein the instructions to simplify the proto-rule comprise instructions to cause the one or more processors to:

determine a score for each condition in the proto-rule; and remove from the proto-rule one or more conditions whose score is below a predetermined or configurable threshold.

13. The system of claim 10, wherein the instructions to simplify the proto-rule comprise instructions to cause the one or more processors to:

determine a score for each condition in the proto-rule, the score based, at least in part, on respective fractions of fingerprints matching the condition in a database of clean fingerprints, a database of malware fingerprints, and a database of unknown fingerprints; and retain in the proto-rule one or more conditions whose score is in a set of top scores and remove from the proto-rule conditions whose score is not in the set of top scores.

14. The system of claim 10, wherein the instructions further comprise instructions to cause the one or more processors to:

in response to a determination that the condition in the proto-rule is different from each condition in the second proto-rule, increase the score of the condition in the proto-rule.

15. The system of claim 10, wherein the determination that the condition in the proto-rule is similar to the condition in the second proto-rule comprises instructions to determine that the condition in the second proto-rule is a subset of the condition in the proto-rule.

16. The system of claim 10, wherein the determination that the condition in the proto-rule is similar to the condition in the second proto-rule comprises instructions to determine that the condition in the second proto-rule overlaps the condition in the proto-rule.

17. The system of claim 10, wherein the determination that the condition in the proto-rule is similar to the condition in the second proto-rule comprises instructions to determine that the condition in the second proto-rule is the same as the condition in the proto-rule.

18. The system of claim 10, wherein the instructions further comprise:

in response to determination that the set of candidate rules is empty:

increment N;

iteratively perform operations a-d for the predetermined or configurable number of iterations.

19. A non-transitory computer-readable medium having stored thereon computer-executable instructions to cause one or more processors to: receive a set of fingerprints, each fingerprint including a set of features of a file; cluster the set of fingerprints into one or more clusters; and for each cluster of the one or more clusters: create a proto-rule, simplify the proto-rule using negative feedback to create a candidate well-formed rule, comprising: randomly selecting a subset of conditions in the proto-rule; in response to determining that none of the conditions in the subset match any of the fingerprints in a database of clean fingerprints improving the score of each of the conditions in the subset; creating a second proto-rule from a cluster of clean fingerprints; comparing each condition in the proto-rule with each condition in the second proto-rule; and in response to determining that a condition in the proto-rule is similar to a condition in the second proto-rule, reducing the score of the condition in the proto-rule, initializing N to the smallest number of conditions allowed in a well-formed rule; iteratively performing for a predetermined or configurable number of iterations operations a-d comprising: a. randomly selecting a subset of N conditions from the N+X top scoring conditions, where X is a predetermined or configurable constant, b. creating a potential candidate rule from the subset of N conditions, c. determining a C score, M score, and U score for the potential candidate rule, the C score based, at least in part, on fractions of fingerprints matching the potential candidate rule in a database of clean fingerprints, the M score based, at least in part, on fractions of fingerprints matching the potential candidate rule in a database of malware fingerprints, and the U score based, at least in part, on fractions of fingerprints matching the potential candidate rule in a database of unknown fingerprints, and d. in response to determining that the C score is zero, adding the potential candidate rule to a set of potential candidate rules; and selecting, as the candidate rule, a rule from the set of candidate rules having the highest combined M score and U score, determine if the candidate well-formed rule is a valid well-formed rule, and in response to a determination that the candidate well-formed rule is a valid well-formed rule, add the valid well-formed rule to a set of malware detection rules.

* * * * *